Dec. 1, 1959     F. BRONSTERT     2,915,577
ANNULAR PERMANENTLY SEALED ALKALINE ACCUMULATOR
Filed Nov. 12, 1957

INVENTOR:
FRANZ BRONSTERT

By Erich M. H. Radde
Agent

United States Patent Office 2,915,577
Patented Dec. 1, 1959

2,915,577

ANNULAR PERMANENTLY SEALED ALKALINE ACCUMULATOR

Franz Bronstert, Bad Homburg, Germany, assignor to Accumulatoren - Fabrik Aktiengesellschaft, Hagen, Westphalia, Germany, a corporation of Germany Application November 12, 1957, Serial No. 695,691

8 Claims. (Cl. 136—13)

The present invention relates to permanently hermetically sealed alkaline accumulators, and more particularly to annular electric storage batteries of this type which may be used, for instance, for electric wrist watches.

Annularly shaped cells for storage batteries are required for many purposes, for instance, for supplying electric current to electric wrist watches and the like. The manufacture and assembly of such devices, however, is quite costly because ordinarily electrodes of annular shape must be provided which are difficult to manufacture.

It is the primary object of the present invention to overcome this disadvantage and to produce annular alkaline accumulators with ease and economy.

This and other objects are accomplished by providing a tubular cell container of flexible material in which stretchable, preferably wave-shaped, electrodes are mounted about an interposed separator which must also be flexible and stretchable.

The annular accumulator of this invention is assembled by mounting the two electrodes with the interposed separator in a straight flexible tube. The electrolyte is then placed in the tube container in a conventional manner. Thereafter the two tube ends are hermetically sealed with respective opposite ends of the electrodes leading through the seal outwardly of the container. The resulting tubular cell is then flexed to form it into a ring with the two electrode leads positioned side by side. The annularly flexed tube is preferably placed into an annular protective casing.

Since hermetically sealed alkaline accumulators are well known and the present invention is not concerned with any particular type of accumulator but is applicable to any conventional electric storage battery of this type, the accumulator structure and composition will not be further described in great detail except insofar as it is pertinent to the invention which is concerned with the shape of the battery, the nature of its container and certain physical properties of the electrodes, and the method of assembly.

The present invention will be more fully understood in the light of the following description of a preferred embodiment thereof, taken in conjunction with the drawing wherein—

Figure 2:
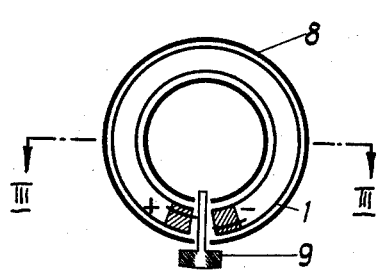
Fig. 2 is a section along the line II—II of Fig. 3 and shows the tube flexed into a ring and mounted in a protective casing.

Referring now to the drawing, there is shown a tubular cell container 1 of flexible material in which there are mounted the two stretchable electrodes 2 and 3, separator 4 being arranged between the electrodes in a conventional manner. The seals 5 hermetically close the storage battery cell, electrode leads 6 and 7 being led through the seals to form the positive and negative terminals of the cells. As shown, electrode 3 is of sinuous shape while electrode 2 is provided with spaced wave-like protrusions. Both electrodes may be extended.

Except for the nature of the cell container 1 and of the stretchability of the electrodes, the structure of the alkaline accumulator, which is permanently hermetically sealed, is conventional. Therefore, a further description thereof is eliminated to avoid prolixity.

After the cell is sealed, the tube is flexed to form a ring, as shown in Fig. 2, so that the lead-ins 6 and 7 are positioned closely adjacent. The tubular cell is then mounted in a protective casing 8 which is preferably of metal.

The tubular cell container 1 may be made of any suitable flexible material, flexible plastics being preferred. A great many of the modern synthetic materials are suitable for the purpose, as will be obvious to the skilled in the art, and polyethylene and various synthetic rubbers have been found useful.

Fig. 2 illustrates the annular accumulator applied to an electric wrist watch where the stem 9 of the watch is arranged between the ends of the battery.

Following there are given by way of example the materials used for cells according to the present invention without, however, limiting the same thereto.

The electrodes are composed of nickel, cadmium, iron, nickel plated iron or alloys thereof in the form of foils, sheets of sintered metal, expanded metal, metal cloth, metal gauze, wire net preferably of a thickness between about 0.2 mm. and about 1.0 mm.

The active material for the positive electrode plates is preferably composed of nickelous hydroxide which may have added thereto flake nickel or graphite to provide the necessary conductivity. The negative electrode plates are most suitably filled with cadmium oxide or cadmium hydroxide to which a small amount of iron may be added.

Especially suitable electrodes consist, for instance, of sintered nickel of high porosity, such as plaques made by thermal decomposition of nickel carbonyl on a coarsely woven nickel wire cloth. The sintered electrodes are then impregnated with the active materials nickel oxide and cadmium.

The electrodes and their active materials may be enclosed in casings of the above mentioned fabrics of alkali-resistant plastic material so as to prevent chipping or peeling off of the active material from the reenforcing electrode plate. Such casings serve simultaneously as separators.

When using metal foils for the electrodes they are preferably wave-shaped or corrugated so that stretching and flexing does not impair their stability. The rippling or corrugation should be between about one and a half to three times the thickness of the electrode. Electrode plates made of expanded metal or of wire gauze have preferably meshes of a size less than 1 mm. In general, the mesh aperture should not be less than about $30\mu$ to $50\mu$.

The electrolyte conventionally consists of an about 25% potassium or sodium hydroxide solution (density: 1.23) to which a small amount of lithium hydroxide may be added to prolong the service life of the cell.

The separator is formed of a thin, finely porous fabric of synthetic fiber materials known to the trade as nylon, perlon, saran, dynel, or the like alkali resistant textile fabric, of microporous foils of polystyrene, polyvinylchloride and the like, of strips of regenerated cellulose which possess sufficient permeability to the electrolyte, or polyvinyl alcohol, and the like alkali-resistant, liquid-permeable material.

*Example*

Figure 1:
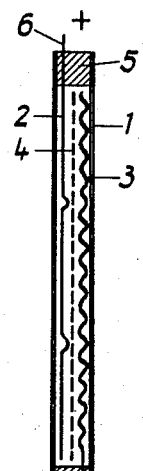
Fig. 1 is a vertical section of the straight cell tube container before flexing it to the annular cell.
Figure 3:
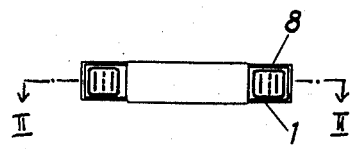
Fig. 3 is a section along line III—III of Fig. 2.

A thin flexible rubber tube of 125 mm. length and an inner diameter of 8 mm. is provided as cell container 1. A sheet of nickel gauze of a thickness of about 0.5 mm., a length of about 100 mm., and a width of about 4 mm. and of slightly corrugated shape carries in its meshes nickelous hydroxide as active material. It forms the positive electrode 2 as shown in Fig. 1. A second sheet of nickel gauze of the same dimensions which, however, is more corrugated than electrode 2, as shown in Fig. 1, forms the negative electrode 3. It carries in its meshes the cadmium oxide-cadmium hydroxide active material. Both electrodes 2 and 3 are provided at opposite ends with wires 6 and 7 which serve as terminals. Separator 4 of a microporous polystyrene foil of about 110 mm. length and about 0.7 mm. width is placed between the two electrodes 2 and 3 and the assembled electrodes-separator unit is introduced into rubber tube 1 which is suspended vertically. The lower end of rubber tube 1 is then closed by a rubber stopper 5 through which wire terminal 7 is passed. The assembled cell which is still open at the top is then filled with the electrolyte, a potassium hydroxide solution of the density 1.23. The open cell is then charged at constant current for 14-20 hours at 0.001-0.01 amperes and at voltages between 1.4 volts and 1.5 volts. As soon as charging is completed, excess liquid electrolyte is poured out of the cell so that only as much electrolyte remains therein as is retained by capillary attraction by the porous electrodes and separator. The upper opening of the cell is closed by rubber stopper 5 whereby wire terminal 6 is passed therethrough. The resulting sealed cell is then flexed to a ring as shown in Fig. 2 and is placed into the nickel casing 8. The cell is now ready for use as a current supply for an electric wrist watch. The capacity of such a cell is about 0.01-0.1 ampere hours.

It is, of course, understood that many changes and variations in the dimensions of the annular cell according to the present invention, in the materials composing the container, the electrodes, the active materials, the separator, the electrolyte, the terminals, and the casing, in the manner in which the cells are assembled and first charged, and the like may be made by those skilled in the art in accordance with the principles set forth herein and in the claims annexed hereto.

I claim:

1. An annular, permanently sealed alkaline storage battery comprising an annular tubular container of flexible material having two open ends adjacent one another, hermetic sealing means permanently closing each open end of said container, two annular, flexible electrodes mounted in the annular tubular container, each electrode extending longitudinally through said tubular container and having one end near a respective one of said sealing means inside the container and another end forming a battery terminal leading outside the container through the sealing means in an opposite one of said open container ends, and an annular separator means disposed in the container between said electrodes.

2. The annular alkaline storage battery of claim 1, wherein said flexible material of said tubular container is plastic material.

3. The annular, alkaline storage battery of claim 1, wherein said flexible electrodes are at least partially wave-shaped.

4. The annular alkaline storage battery of claim 1, comprising an annular protective casing wherein the tubular container is mounted.

5. The annular alkaline storage battery of claim 4, wherein said protective casing is of metal.

6. An annular, permanently sealed alkaline storage battery comprising an annular tubular container of flexible material having two open ends adjacent one another, hermetic sealing means permanently closing each open end of said container, two annular, at least partially wave-shaped, flexible electrodes mounted in the annular tubular container, each electrode extending longitudinally through said tubular container and having one end near a respective one of said sealing means inside the container and another end forming a battery terminal leading outside the container through the sealing means in an opposite one of said open container ends, an annular separator means disposed in the container between said electrodes, and an annular protective casing wherein the tubular container is mounted with the two battery terminals lying adjacent one another.

7. The annular alkaline storage battery of claim 6, wherein said flexible container material is plastic material.

8. The annular alkaline storage battery of claim 6, wherein said protective casing is of metal.

References Cited in the file of this patent

UNITED STATES PATENTS

| | | |
|---|---|---|
| 338,770 | Otto | Mar. 30, 1886 |
| 1,677,032 | Kaffer | July 10, 1928 |
| 1,774,037 | Owens | Aug. 26, 1930 |
| 2,536,699 | Ruben | Jan. 2, 1951 |
| 2,662,366 | Koehler | Dec. 15, 1953 |
| 2,865,163 | Ensign et al. | Dec. 23, 1958 |